No. 815,663. PATENTED MAR. 20, 1906.
J. WALKER & B. M. FREDERICK.
ANIMAL TRAP.
APPLICATION FILED AUG. 28, 1905.
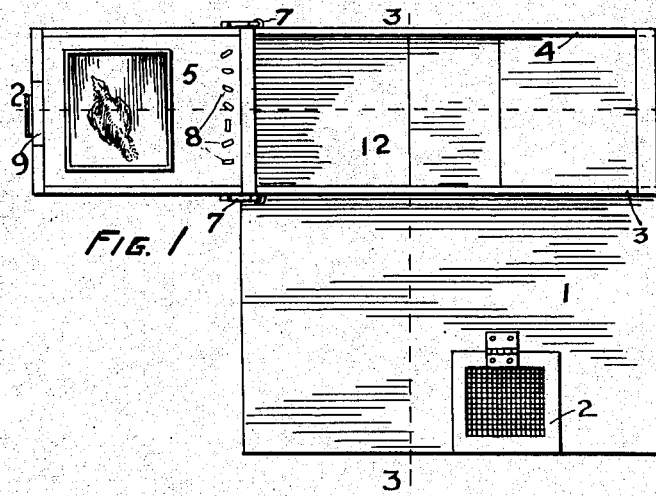
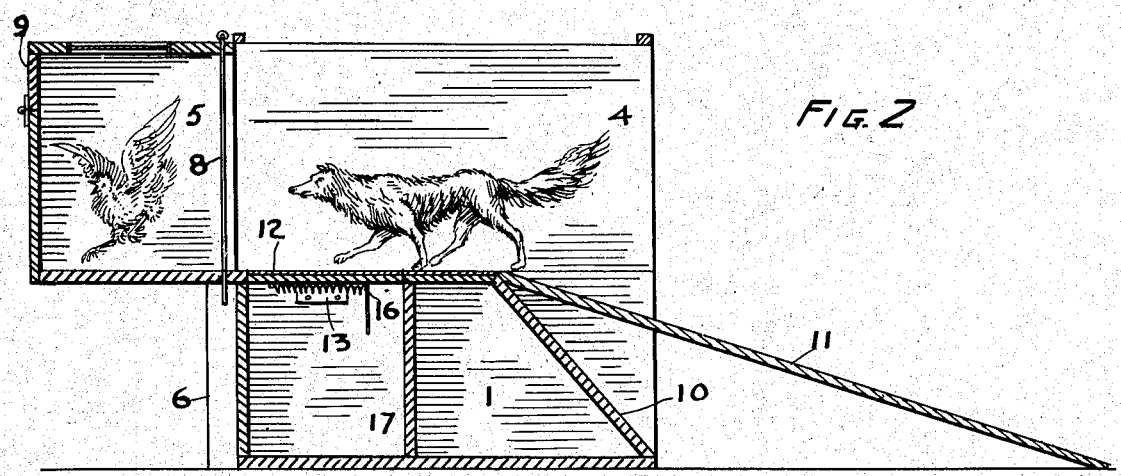
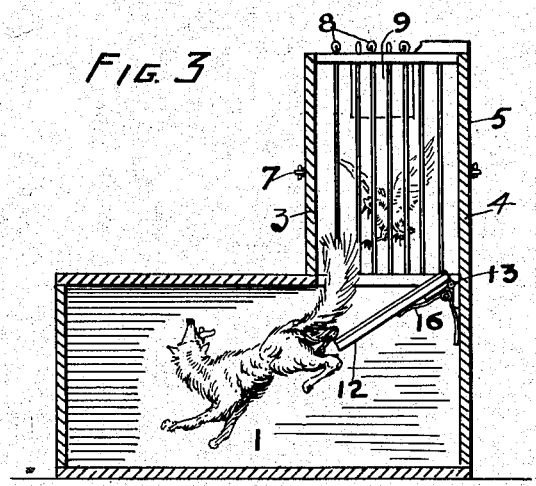
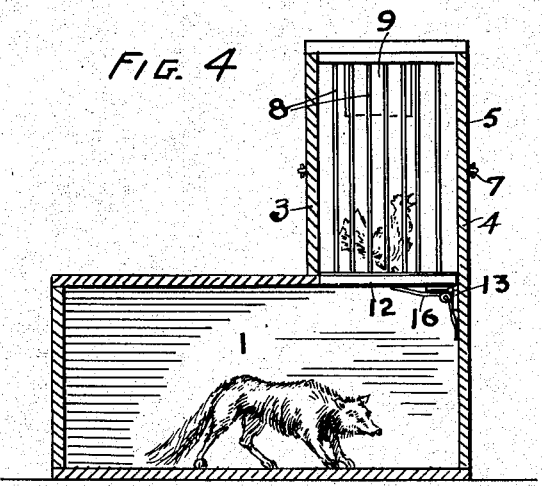
WITNESSES:
INVENTORS,
J. Walker
B. M. Frederick
By F. M. Wright,
Attorney

UNITED STATES PATENT OFFICE.

JOSEPH WALKER AND BRAINARD M. FREDERICK, OF SAN FRANCISCO, CALIFORNIA.

ANIMAL-TRAP.

No. 815,663.  Specification of Letters Patent.  Patented March 20, 1906.

Application filed August 28, 1905. Serial No. 276,021.

*To all whom it may concern:*

Be it known that we, JOSEPH WALKER and BRAINARD M. FREDERICK, citizens of the United States, residing at San Francisco, in the county of San Francisco and State of California, have invented certain new and useful Improvements in Animal-Traps, of which the following is a specification.

This invention relates to improvements in animal-traps, the object of the invention being to provide a trap which will be simple and cheap in construction and effective in operation and which can be used to catch a number of animals in succession by means of the same bait.

In the accompanying drawings, Figure 1 is a plan view of the trap. Fig. 2 is a longitudinal section thereof on the line 2 2 of Fig. 1. Fig. 3 is a transverse section thereof on the line 3 3 of Fig. 1, the parts being in the position in which the animal is being precipitated into the cage. Fig. 4 is a similar view showing the animal trapped.

Referring to the drawings, 1 represents a box or cage having a door 2 in the top, through which the animals can be removed after having been trapped. One side of this box is continued upward to form a guide-wall 4, and opposite thereto on the top of the box is a guide-wall 3, said walls thus forming a passage-way for the animal in front of a bait-box 5. Said bait-box is supported upon posts 6 and is secured in position by hooks 7, hooked into staples on the side walls 4 and 3. A side of the bait-box next to this passage consists of a grating formed by removable bars or pins 8. At the opposite side of the bait-box is a small door 9, through which the chickens or other animals used for bait may be fed, and at the top of the box is a window through which light can pass into the box, so as to render the bait conspicuously visible to the animal to be captured. The top of the cage underneath said passage is cut away and substituted by a sloping side 10 to permit of the provision of an inclined approach 11 to said passage, up which the animal can easily ascend thereinto. The animal having entered said passage and springing toward the bars of the grating, steps upon a trap-door 12, hinged at one side, as shown at 13, and pressed upward by a light spring 16. This trap-door gives way beneath him, causing the animal to be precipitated into the box or cage beneath. The trap-door immediately rises under the action of the spring and the animal is held captive in the cage.

17 is a wall supporting the end of the passage next to the edge of the trap-door.

The nature of the apparatus is such that a number of animals may be captured in succession by the use of the same bait. It is especially valuable for the capture of coyotes in farming districts. It is not intended to be placed close to the farm-house, but out in the fields at a point where the coyote or other animal will not be afraid to approach the trap.

We claim—

In a device of the character described, the combination of a box, one side of which is continued upward to form a guide-wall, a second guide-wall on the top of the box, said walls forming a passage-way, a bait-box opposite the end of said passage-way, posts upon which said bait-box is supported, means for securing said bait against the ends of the side walls, said bait-box having a grating on the side opposite the passage, and a door at the opposite side, the top of the cage or box underneath said passage being cut away, a sloping approach in said passage, a trap at the end of said passage next the bait-box, said trap being hinged at the side next the side of the box forming the guide-wall, and a spring normally pressing upward said trap, substantially as described.

In witness whereof we have hereunto set our hands in the presence of two subscribing witnesses.

JOSEPH WALKER.
BRAINARD M. FREDERICK.

Witnesses:
E. WOODWARD,
BESSIE GORFINKEL.